April 26, 1955
J. STERN
2,707,161
METHOD OF JOINING COMPLEMENTARY PORTIONS OF
A CYLINDRICAL HOLLOW THERMOPLASTIC ARTICLE
Filed June 24, 1952
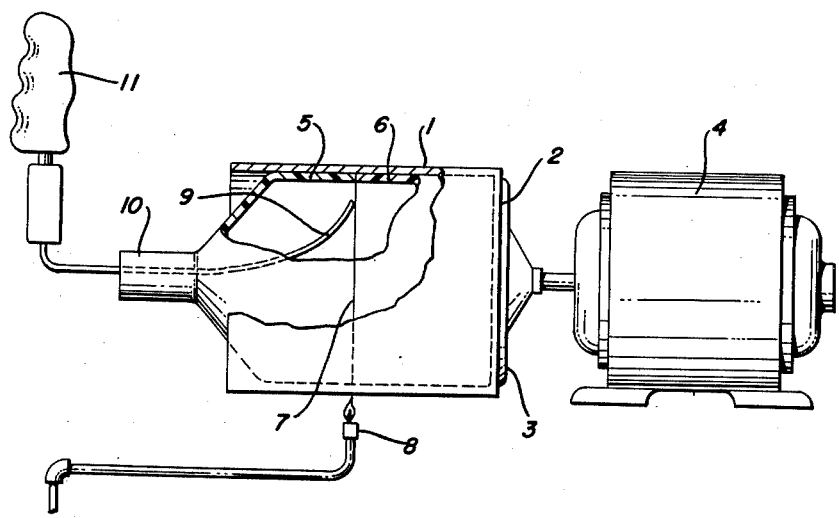
INVENTOR.
JULIUS STERN
BY
ATTORNEYS United States Patent Office 2,707,161
Patented Apr. 26, 1955

2,707,161

METHOD OF JOINING COMPLEMENTARY PORTIONS OF A CYLINDRICAL HOLLOW THERMOPLASTIC ARTICLE

Julius Stern, East Cleveland, Ohio

Application June 24, 1952, Serial No. 295,180

6 Claims. (Cl. 154—83)

This invention relates generally to a method of and means for making hollow articles of fusible plastic materials.

A primary object of the invention is to provide a method of and means for joining or uniting parts made of thermoplastic materials, more particularly of polyethylene, in such a manner as to produce a joint which is scarcely discernible, which is free from flash, and which is substantially as strong as the plastic itself.

Another object of the invention is to provide a method of integrating parts of the character described without the use of extraneous or conventional plastic bonding agents or adhesives.

A further object of the invention is to provide a method of the character described, which is relatively simple, highly economical and commercially feasible.

A still further object of the invention is to provide a hollow or substantially hollow article of polyethylene or like plastic, made by joining parts along a median transverse plane through the article, and in which the joint is no thicker or thinner than adjacent parts of the article.

Other objects and advantages of the invention will become apparent in the course of the following description of the invention, taken in connection with the single figure of the drawing, which illustrates, somewhat diagrammatically, apparatus used in practicing the invention as well as the actual method employed.

Referring more particularly to the drawings, there is disclosed a metallic drum 1, which is open at one end and closed at the other end, the closed end 2 having attached thereto a spider or disk 3, whereby the drum may be rotated, as by means of a variable speed motor 4.

The upper and lower molded portions 5 and 6 of the flask or container which are to be united or "welded" to each other are placed in the drum in the manner shown, with the edges of these portions in abutment with each other, the seam butt joint or line formed by said abutting edges being indicated by reference numeral 7.

The portions 5 and 6 are molded from a thermoplastic molding powder such as polyethylene, a type of plastic which is tough, elastic, and flexible, but which is made from a paraffin or wax base, so that the parts cannot be satisfactorily integrated or bonded to each other by means of conventional plastic bonding materials or adhesives, such as acetone.

The parts 5 and 6 are of slightly smaller external diameter than the internal diameter of the drum so as to permit the parts to be readily slid or placed endwise in the drum, but the difference in these diameters is not so great that the parts 5 and 6 are not rotated frictionally by the drum as the drum is rotated.

The drum is now rotated at a relatively low speed, and at the same time, heat is applied to a localized portion of the exterior of the drum at a point or area directly adjacent the seam or joint 7. This heat may be supplied by a gas burner, such as the burner 8, or by an electric heating device or element, or by any other means capable of supplying heat in this manner. The heat thus supplied is radiated by the drum to the joint 7, and causes the edges forming the butt joint to become fused.

Hot inert gas or highly filtered heated air is simultaneously injected against the inside of the joint, as by a tube 9 extending through the neck 10 of the part 5, which tube is part of a conventional plastic gun 11. This is continued until the joint attains a viscous condition.

At this point, the external and internal heating of the joint is discontinued, and the speed of the drum is immediately increased to a point sufficient to cause the viscous plastic to be forced centrifugally against the internal surface of the drum, and with sufficient pressure to fuse the parts 5 and 6 together, forming a perfect bond therebetween when the parts are cooled.

The bond between the integrated parts 5 and 6 is as strong as the plastic itself and the joint is scarcely discernible. The joint is free from flash or any projecting material which requires removal, and the container is no thicker at the joint than at other parts. The container is especially adaptable for holding certain types of acids, and may be made in any desired size.

The apparatus, as thus disclosed, may also be used in either the form shown, or somewhat modified, to integrate halves of a sphere or a closed cylinder, and in such case, the internal heating is necessarily omitted, only external heating being applied. Under such conditions, the temperature or degree of external heating may be increased to compensate for the absence or lack of internal heating.

Although the joint 7 is disclosed as an ordinary butt joint, it will be readily understood that the parts 5 and 6 may be molded to provide a lap joint, a scarfed joint, a dovetail joint, or any other type of joint. It will be further understood that the joint need not be located centrally of the article, but may be located at any desired point medially of the article or close to the ends of the article.

Moreover, the drum may be made sufficiently long to permit joint fusion of a multiplicity of articles, suitable modification of the drum structure and rotating means being made for this purpose.

Although the invention has been described particularly with reference to its use in connection with the bonding of parts or elements made of polyethylene, it is adaptable to some extent for use in connection with parts made of other plastics which are difficult or impossible to unite or join by means of conventional adhesives or bonding agents, such, for example, as nylon, vinyl, etc.

The terms "annular" and "generally annular" which appear in the appended claims are intended to include the joinable areas or edges of parts which form the joint 7 of the article or container described, as well as joinable areas or edges similar to such areas or edges, which need not be in the form of a true circle, and which need not form a fully closed geometric figure.

It will be understood that various other changes may be made in the form, details, arrangement and proportions of the parts, without departing from the scope of my invention.

What I claim is:

1. The method of joining complementary portions of a cylindrical hollow article of thermoplastic material, comprising the steps of bringing the edges of said portions into annular abutment with each other to form a joint, confining said joint within a concentrically disposed outer cylinder to maintain it against radial displacement, rotating said joint and cylinder simultaneously, and applying sufficient heat to the area of the joint to cause fusion of the joint during said rotation.

2. The method of joining complementary portions of a cylindrical hollow article of thermoplastic material, comprising the steps of bringing the edges of said complementary portions into annular abutment with each other to form a joint, confining said joint within a concentrically disposed outer cylinder to secure said edges against radial displacement, rotating said joint and cylinder simultaneously to exert an effective centrifugal force upon said joint, and during said rotation heating the area of said joint sufficiently to cause fusion of the edges thereof.

3. The method of joining complementary portions of a cylindrical hollow article of thermoplastic material, comprising the steps of bringing the edges of said complementary portions into annular abutment with each other to form a joint, confining said joint within a concentrically disposed outer cylinder to secure said edges against radial displacement, rotating said joint and cylinder simultaneously, applying heat to said cylinder in the area of said joint, and applying heat interiorly of said article in the area of said joint during said rotation to effect fusion of said edges.

4. The method of joining complementary portions of a cylindrical hollow article of thermoplastic material, comprising the steps of bringing the edges of said complementary portions into annular abutment with each other to form a joint, confining said joint within a concentrically disposed outer cylinder to secure said edges against radial displacement, rotating said joint and cylinder simultaneously, heating said joint sufficiently to cause fusion of said edges during said rotation, and then increasing the speed of said rotation to exert an effective centrifugal force upon the fused area.

5. The method, as defined in claim 4, in which said thermoplastic material is polyethylene.

6. The method, as defined in claim 7, in which said hollow article is a flask.

References Cited in the file of this patent

UNITED STATES PATENTS

| | | |
|---|---|---|
| 846,823 | Cazin | Mar. 12, 1907 |
| 1,226,293 | Wilson | May 15, 1917 |
| 1,995,977 | Gonda | Mar. 26, 1935 |
| 2,151,840 | Dichter | Mar. 28, 1939 |
| 2,319,683 | Hofmann | May 18, 1943 |
| 2,588,604 | Archer | Mar. 11, 1952 |
| 2,597,153 | Lagarde et al. | May 20, 1952 |

FOREIGN PATENTS

| | | |
|---|---|---|
| 642,444 | Great Britain | Sept. 6, 1950 |